Sept. 30, 1969 T. G. SMOLKA ET AL Re. 26,670

SAFETY BINDING

Original Filed June 1, 1966 2 Sheets-Sheet 1

Inventors:
Thomas G. Smolka
Gottfried Lehnerzer
By Ernest I. Strautkaque
Attorney

SAFETY BINDING

Original Filed June 1, 1966 2 Sheets-Sheet 2

Inventors:
Thomas G. Smolka
Gottfried Schwarzer
By Ernest T. Montague
Attorney

United States Patent Office

Re. 26,670
Reissued Sept. 30, 1969

26,670
SAFETY BINDING

Thomas G. Smolka and Gottfried Schweizer, Vienna, Austria, assignors to Wiener Metallwarenfabrik Smolka & Co., Schwechat, Austria, a corporation of Austria Original No. 3,333,859, dated Aug. 1, 1967, Ser. No. 554,449, June 1, 1966. Application for reissue Nov. 29, 1967, Ser. No. 689,734
Claims priority, application Austria, June 2, 1965, A 5,025/65
Int. Cl. A63c *9/10, 9/22*
U.S. Cl. 280—11.35 9 Claims

Matter enclosed in heavy brackets [ ] appears in the original patent but forms no part of this reissue specification; matter printed in italics indicates the additions made by reissue.

*ABSTRACT OF THE DISCLOSURE*

*A safety binding for a ski boot having a pivotable holding down device, which snaps into operative position when engaged by a ski boot being positioned for clamping and which can be released voluntarily by a light pressure from a ski stick comprising a base plate secured to a ski, a slide member slidably carried by the base plate, the slide member pivotally carrying the holding down device and a locking means for the holding down device, and the locking means being positioned to engage with the holding down device to maintain the same in its operative clamping position, and being spring-biased by a spring positioned between an extension of the base plate of the locking means to thereby urge the locking means in clamping position and holding down device into engagement in clamped position and the slide and holding down device against the boot.*

Figure 3:
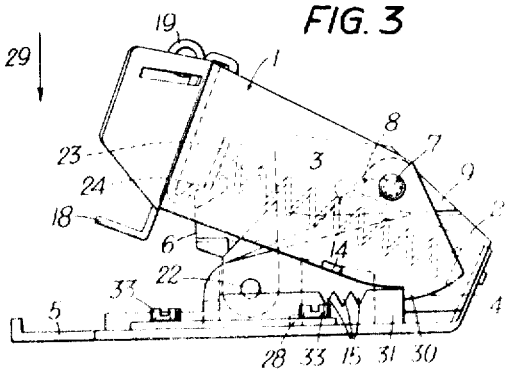

The invention relates to a safety ski binding having a pivotable holding down device which automatically snaps in when stepping in for clamping the ski boot and which can be opened voluntarily, for instance by effecting a slight pressure with the ski stick. According to the invention, the holding down device is provided pivotably on a slide.

The object of invention is shown by way of example in one embodiment in the drawings.

Figure 1:
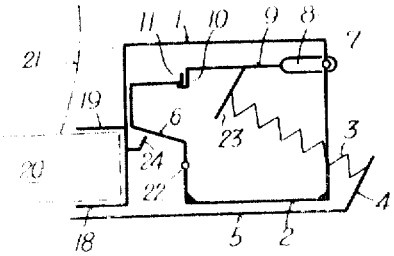
Figure 4:
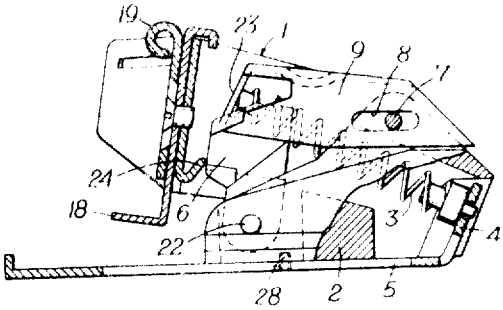
Figure 2:
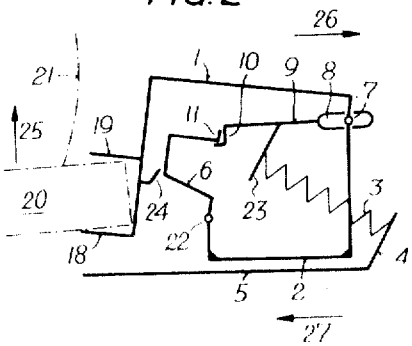
Figure 5:
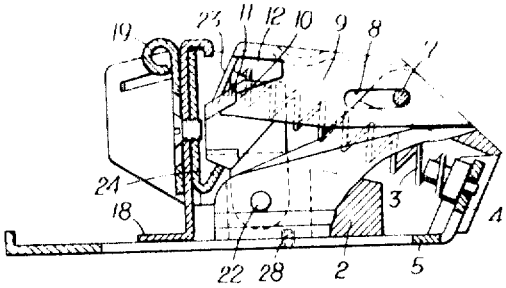
Figure 6:
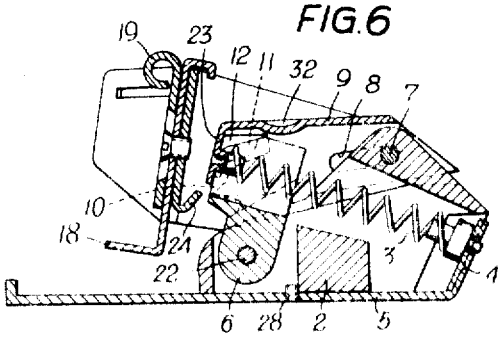
Figure 7:
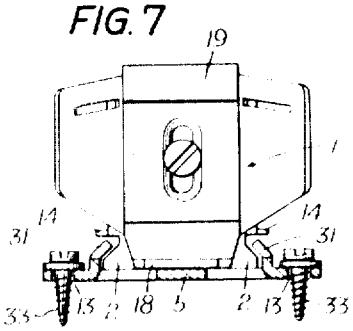
Figure 9:
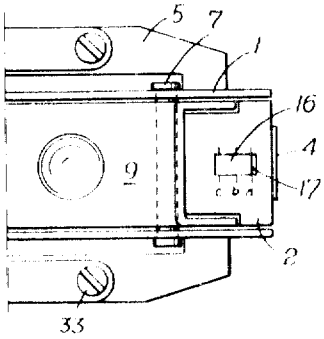
Figure 8:
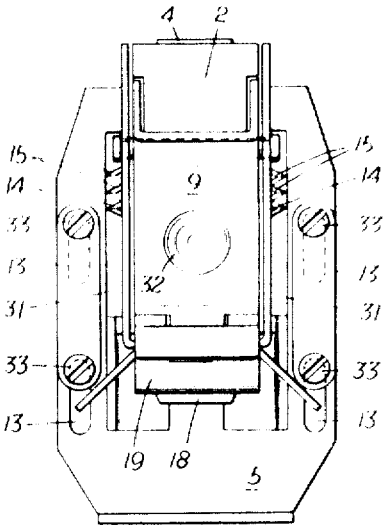
Figure 10:
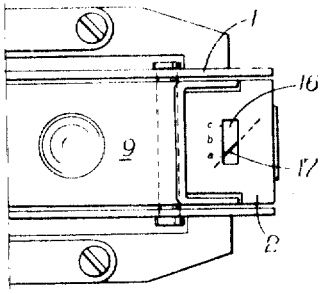

FIGS. 1 and 2 represent the safety binding schematically. By the FIGS. 3 through 6, a construction of the safety binding is shown in different positions. The figures are partly in section. FIGS. 7 and 8 show a front and top view of the binding. FIGS. 9 and 10 are also top views showing an indication device too.

In FIG. 1 the holding down device has the reference numeral 1 and is holding down the sole 20 of a ski boot 21 in a manner known per se by way of extensions 18 and 19. Thereby, the extension 18 is provided as a spur being pressed down when stepping in. The extension 19 surrounds the sole 20 from above, thus that the sole is really clamped. FIG. 1 shows the normal position of operation. The holding down device 1 is pivotably connected to a slide 2 at the center of rotation 7. This slide 2 can be moved to and fro on a base plate 5. A lock 6 being likewise pivotable about the center 22 is attached to the slide 2. Thus, the slide 2 carries (at 7 and 22) two pivotable construction elements (namely the hodling down device 1 and the lock 6). Additionally a release lever 9 is arranged at the center of rotation 7 above an oblong hole, which lever carries an extension 10. This extension 10 acts upon a stop 11 of the lock 6. The spring 3 rests on the one hand on the extension 4 of the base plate 5 and on the other hand on a leg 23 of the release lever 9. Thus, the spring 3, by way of the leg 23 and the release lever 9, presses the extensions 10 and 11, the slide 2 and also the holding down device 1 against the sole 20 of the ski boot 21. Thereby of course the horizontal component only of the force of the spring 23 is effected. As one can see, the lock 6 holds the holding down device 1 over a stop 24 in this position of operation.

If the sole 20 is moved upwards in the direction of the arrow 25 in case of an overload, this binding or this jaw releases as can be seen in FIG. 2. At the beginning of the upward movement in the direction of the arrow 25, the stop 24 contacts the lock 6 being inclined at the point of contact (between these two parts). The lock 6 is thus turned clockwise about the point 22. In this manner by way of the elements 11, 10, and 9, a displacement of the release lever 9 in direction of the arrow 26 takes place. Thereby, the spring 3 is compressed. Thus, there is a certain counter acting force to the upward movement according to the arrow 25. On account of the oblong slot 8, the release lever 9 can be moved in the direction of the arrow 26 during this operation. If the upward movement according to the arrow 25 continues, one reaches the position according to FIG. 2. Now, the parts 24 and 6 come out of contact so that the holding down device 1 becomes completely free and can turn about the point 7 in upward direction (clockwise). Thereby the sole 20 is released. Tottering of the holding down device 1 is prevented by the fact that the stop 24 is always connected by way of friction with the lock 6, i.e. by coacting with the contour of the lock 6 shown vertically in FIG. 1. If the ski boot is released, the spring 3 presses the slide 2 by way of the lever 9 in the direction of the arrow 27 that far to the left hand side and until the right end of the oblong slot 8 rests on the point 7. However, thereafter the spring 3 moves the slide 2 together with the whole jaw in direction of the arrow 27 to the left, until the said slide 2 (FIG. 6) abuts a stop 28 of the base plate 5.

If wanted, one can now step into the jaw again from above, whereby automatically the position of operation according to FIG. 1 is effected.

It is pointed to the fact that by the force of the spring 3 a suitable thrust onto the sole 20 is provided for a safe clamping. Further on, a suitable safety force is given which only can be overcome by an overload.

After these explanations, the different positions according to the FIGURES 3 to 6 are on the whole self evident.

FIG. 3 shows the jaw in its open position. A further upward movement of the holding down device 1 is prevented by the fact, that this holding down device 1 abuts with its extensions 30 a rail 31 of the base plate 5. If one steps in with the sole 20 in direction of the arrow 29, the holding down device 1 is pressed downwards. The stop 24 slides along the lock 6 downwardly and turns the same about the point 22 clockwise. (See FIG. 4). Thereby the spring 3 is compressed. Now a position is reached as is shown schematically in FIG. 2 for the release. If the sole 20 of a ski boot is pressed further downwards, one reaches the position of operation according to FIG. 5 corresponding to the schematic representation according to FIG. 1.

If one intends to open the jaw by hand, one presses the release lever 9 in direction of the arrow 32 (see FIG. 6), for instance by way of the ski stick. This lever 9 is turned counter-clockwise about the point 7, extension 10 and stop 11 are disengaged and the lock 6 can turn clockwise about the point 22, whereby the stop 11 enters the recess 12 of the release lever 9. The holding down device 1 can now easily turn upwards, so that the ski boot is released without further steps. The stop 24 passes thereby the lock 6 unhindered.

*The release lever 9 is protected between the side walls of the holding down device 1. The upper edges of the side walls are disposed at about the same height as the upper end face of the releasing lever 9. A release is, as described*

*above, possible only in such manner that a pressure is exerted downwardly on the recess 32 of the release lever 9, which pressure pushes downwardly the release lever 9. The protected arrangement of the release lever 9 has the advantage that a damage of these parts by a cross-wise disposed ski or by a ski boot is not possible. Also, a non-intended opening by other causes, as by branches, roots, or the like, is practically excluded.*

The whole jaw is adjustable in oblong slots 13 for adjusting and fixing the binding for different sizes of the boot (see FIG. 8). A marking 14 is provided at the holding down device 1, which marking is cooperating with marks 15 on the rails 31 of the base plate 5 (see also FIG. 3). The clamping force as well as the release force at the safety opening can be learned from this marking. Different adjustments are possible on account of the oblong slots 13 and the adjustment screws 33.

The FIGURES 9 and 10 show a different embodiment of the respective indication. Here a part fixed to the base plate 5 has a mark 17 which can be observed by a window 16 of the slide 2. At the slide 2, there are corresponding marks, a, b, c, indicating in the above mentioned way the clamping force and the safety force respectively. It is also pointed out that in consideration of differently thick soles in a manner known per se the holding down element 19 of the holding down device I is provided adjustable.

The invention is not restricted to the shown embodiment. The jaw can be used as a heel jaw as well as a toe jaw. Preferably the slide and the lock are made of plastic, the other parts are of metal. The invention is of course not restricted to the use of these materials. Several springs might be used instead of one.

What we claim is:

1. A safety binding for a ski boot having a pivotable holding down device which snaps into operative position when engaged by a ski boot being positioned for clamping and which can be released voluntarily by a light pressure from a ski stick comprising a base plate secured to a ski, a slide member slidably carried by said base plate, said slide member pivotally carrying said holding down device and a locking means for said holding down device, said locking means being positioned to engage with said holding down device to maintain the same in its operative clamping position, and being spring-biased by a spring positioned between an extension of said base plate and said locking means to thereby urge said locking means in their clamping position and holding down device into engagement in their clamped position and said slide and holding down device against said boot.

2. The safety binding, as set forth in claim 1, wherein said locking means includes a displaceable and turnable release lever which can be displaced and turned in the center of rotation of said holding down device by means of an oblong slot, and said release lever abuts with an extension said stop of a turnable lock, so that its force can be transmitted to said slide.

3. The safety binding, as set forth in claim 2, wherein said release lever has a recess, into which during operation, said stop of said turnable lock enters.

4. The safety binding, as set forth in claim 3, wherein said base plate is provided with longitudinal slots for the connection of said slide with said base plate in order to adapt to different sizes of boots.

5. The safety binding, as set forth in claim 4, which includes an indication device.

6. The safety binding, as set forth in claim 5, wherein said indication device is provided in the form of a marking on said holding down device and by several marks on said base plate.

7. The safety binding, as set forth in claim 5, wherein said indication device has a window in said slide, wherein a marking provided on a fixed part of said binding shows the adjusted spring force.

*8. The safety binding, as set forth in claim 2, wherein said holding down device includes side walls spaced apart from each other, and wherein*

*said release lever is disposed between and protected by said side walls, and*

*the upper edges of said side walls being disposed at about the level of the upper end face of said release lever, so that the operation of said release lever is possible by exertion thereto of a predetermined pressure.*

*9. The safety binding, as set forth in claim 2, wherein said relese lever has a leg portion,*

*one end of said spring engages said leg portion of said release lever, and*

*said release lever carries extension locking means at its forward end.*

References Cited

The following references, cited by the Examiner, are of record in the patented file of this patent or the original patent.

UNITED STATES PATENTS

| | | | |
|---|---|---|---|
| 3,125,349 | 3/1964 | Schweizer | 280—11.35 |
| 3,278,195 | 10/1966 | Salomon | 280—11.35 |

LEO FRIAGLIA, Primary Examiner

J. A. PEKAR, Assistant Examiner